United States Patent Office 3,159,617
Patented Dec. 1, 1964

3,159,617
PRODUCTION OF PENICILLINS
John C. Sheehan, Arlington, Mass., assignor, by mesne assignments, to Arthur D. Little, Inc., Cambridge, Mass., a corporation of Massachusetts
No Drawing. Filed May 1, 1959, Ser. No. 810,231
6 Claims. (Cl. 260—239.1)

This application is a continuation-in-part of my application Serial No. 643,260 filed March 1, 1957, now abandoned.

This invention relates to the production of penicillins and particularly to a method of converting penicilloic acids to the corresponding penicillins.

I have found that 4-carboxy-5,5-dimethyl-α-amino-2-thiazolidineacetic acid and its acid salts and the α-amino-N-acylated derivatives and 4-carboxy esters thereof of the general formula

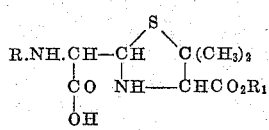

wherein R represents hydrogen or an organic acid radical and $R_1$ represents hydrogen or an alkyl or aralkyl group, can readily be converted into the corresponding penicillanic acid compounds by β-lactamization with a compound of the group consisting of carbodiimides of the formula $R_2.N=C=N.R_3$ wherein $R_2$ and $R_3$ are aliphatic, including cycloaliphatic radical, for example, dicyclohexyl-carbodiimide or ethylmorpholinoethyl-carbodiimide; ketene-imines of the formula

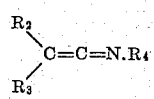

wherein $R_2$, $R_3$ and $R_4$ are aliphatic, including cycloaliphatic radicals, for example, pentamethyleneketenecyclohexylamine; and acetylenic ethers of the formula $ROC\equiv CH$ where R is a hydrocarbon radical, for example, ethoxyacetylene.

In the general formula (A) the group R may be selected from a wide variety of organic acyl groups including, but not limited to, those forming the side chains of the known microbiologically produced penicillins, for example, formyl, acetyl, substituted acetyl (phenoxyacetyl) carboalkoxy (carbomethoxy), carboaralkoxy (carbobenzoxy), carboaryloxy (carbophenoxy) and organic sulphonic acid groups, such as benzenesulphonyl and benzylsulphonyl.

The principles of the invention are illustrated in the following reaction chart and in the specific examples referring thereto describing for the purpose of illustration the production of penicillin V (phenoxymethylpenicillin).

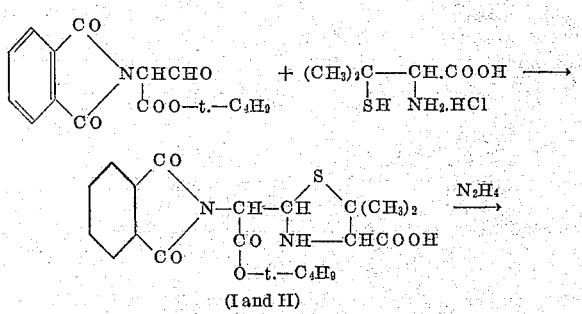

(I and II)

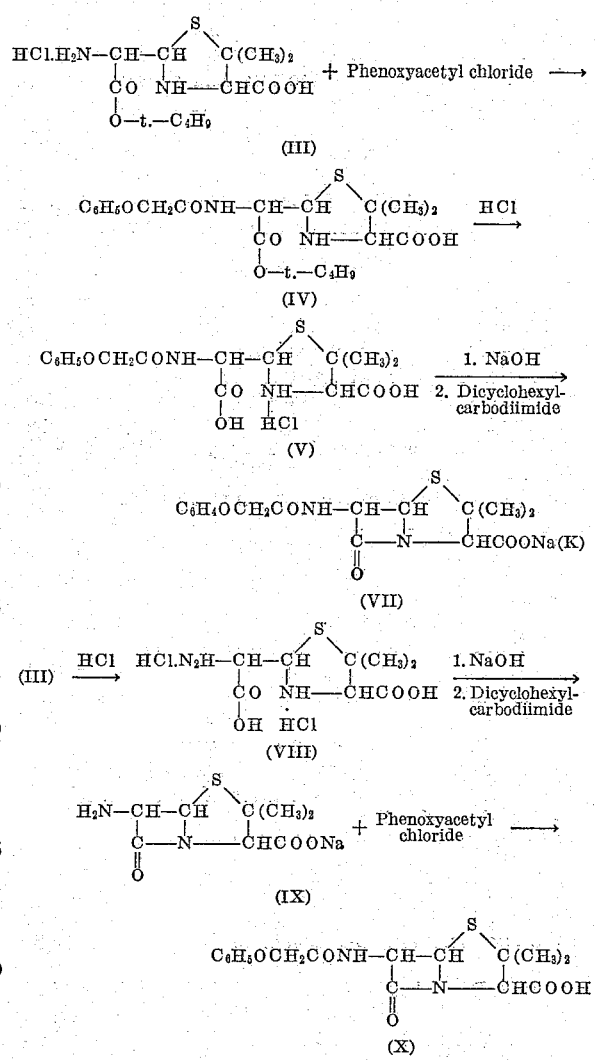

It will be seen from the foregoing reaction scheme that the acyl groups R can be introduced into the amino group of 6-aminopenicillanic acid (IX), thus making possible the production of a wide variety of penicillins and penicillin analogs in which R can be, for example, formyl, acetyl, phenylacetyl, phenoxyacetyl, carbomethoxy, carbobenzyloxy, p-nitrocarbobenzyloxy, carbophenoxy, p-chlorocarbophenoxy, methanesulfonyl, benzylsulfonyl, p-chlorobenzylsulfonyl, phenylsulfonyl, p-aminophenylsulfonyl or N,N-pentamethylenesulfamyl. Although the halides, especially chlorides and bromides, or anhydrides of the acid group to be introduced into the 6-aminopenicillanic acid are particularly suitable, other acylating agents may also be used. Such acylating agents include mixed anhydrides ($RCO-O-OCR^1$), acid azides ($RCON_3$), lactones, particularly β-lactones, "activated esters" such as thiol esters and phenolic esters, carboxylic acids with carbodiimides ($R_2.N=C=N.R_3$) or alkoxyacetylenes ($ROC\equiv CH$), thiolactones, particularly β-thiolactones, and acylated enols.

Other groups can also be introduced into the amino group of 6-aminopenicillanic acid to provide additional types of penicillin analogs by means of such reagents as: isocyanates, for example, phenylisocyanate and ethylisocyanate, to convert the amino group to a substituted urea; isothiocyanates, for example, phenylisothiocyanate and ethylisothiocyanate, to convert the amino group to a substituted thiourea; reactive halogen compounds, such as triphenylmethyl chloride which forms the tritylamino derivative; methylisourea which converts the amino group to a guanadino group; and ethylene oxide and ethylene imine, which add to the amino group with ring opening.

It will be understood that, in general, the alkali metal salts and the acid additional salts of aminopenicillanic acid are the equivalent of the free acid and are intended to be comprised in the term "aminopenicillanic acid."

*t-Butyl D- and DL-4-carboxy-5,5-dimethyl-α-phthalimido-2-thiazolidineacetate (I).*—To an ethanol solution (300 ml.) of t-butyl-α-phthalimidomalonaldehyde (42 g.) is added a solution of D-penicillamine hydrochloride (27.2 g.) and sodium acetate trihydrate (29.9 g.) in 300 ml. of water. After storage for 10 hours, 18.2 g. of crystals are collected by filtration, M.P. 140–141.5° C. dec. This crop is mainly γ isomer. Two crystallizations from methanol-water raise the M.P. to 141–142.5° C. dec., $[\alpha]_D^{26}+23°$ (c., 1 in acetic acid).

Addition of 75 ml. of water to the above filtrate causes the slow crystallization of 9.04 g. of α isomer as colorless needles, M.P. 152–153° C. dec. Addition of a further 60 ml. of water gives another 5.63 g. of α isomer, M.P. 148–151° C. dec. Three recrystallizations from methanol-water gives a constant melting point, 159–160° C. dec., $[\alpha]_D^{25}+54°$ (c., 1 in acetic acid).

In a similar manner, DL-penicillamine hydrochloride and t-butyl α-phthalimidomalonaldehydrate may be condensed.

*t-Butyl D- and DL-α-4-carboxy-5,5-dimethyl-α-phthalimido-2-thiazolidineacetate (II).*—To 350 ml. of pyridine is added 200 g. of t-butyl DL-γ-4-carboxy-5,5-dimethyl-α-phthalimido-2-thiazolidineacetate and the solution heated on a steam bath for 22 hours under an atmosphere of nitrogen. The solution is left 48 hours at 5° C. and the mass of crystals, 80 g., collected by filtration. Recrystallization from acetone water gives 65 g. of t-butyl DL-α - 4-carboxy-5,5-dimethyl-α-phthalimido-2-thiazolidineacetate, M.P. 183° C. dec., identical in infrared spectrum (in KBr) with the authentic DL-α isomer.

In a similar manner t-butyl D-γ-4-carboxy-5,5-dimethyl-α-phthalimido-2-thiazolidineacetate can be isomerized to the corresponding D-α isomer in essentially the same yields.

*t-Butyl D- and DL-α-4-carboxy-5,5-dimethyl-α amino-2-thiazolidineacetate hydrochloride (III).*—A solution of 14.22 g. of t-butyl D-α-4-carboxy-5,5-dimethyl-α-phthalimido-2-thiazolidineacetate (D-II) in 425 ml. of pure dioxane is cooled to 13° C. and 3.80 ml. of hydrazine hydrate added over 1 min. with stirring. The solid which precipitates is redissolved by warming to 18° C. The solution is left at 13–15° C. for 3 hrs., then at room temperature for 21 hrs., after which solvent and excess hydrazine are removed by lyophilization. The phthalhydrazide complex is decomposed by suspending in 310 ml. of acetic acid, cooling to 13° C., adding 8.15 ml. of hydrochloric acid and shaking at room temperature for 30 minutes. The suspension is lyophilized and then suspended in 175 ml. of cold methanol and 5.2 g. (95%) of phthalhydrazide is removed by filtration. Concentration of the filtrate to 80 ml. yields 1.63 g. of hydrazine dihydrochloride, M.P. 199° C. dec. Addition of 275 ml. of ether yields 0.93 g. of impure solid of M.P. 90–125° C. dec. The further gradual addition of 1650 ml. of ether gives 8.78 g. of analytically pure D–III, M.P. 172° C. dec., $[\alpha]_D^{25}+111°$ (c., 1 in methanol).

Similar treatment of 28.44 g. of t-butyl DL-α-4-carboxy - 5,5 - dimethyl-α-phthalimido-2-thiazolidineacetate (DL–II) in 1360 ml. of dioxane with 7.60 ml. of hydrazine hydrate yields 18.8 g. (85%) of analytically pure DL–III, M.P. 170° C. dec.

*t-Butyl D- and DL-α-4-carboxy-5,5-dimethyl-α-amino-2-thiazolidineacetate (IIIa).*—A suspension of 500 mg. of DL–III in 10 ml. of water is quickly heated to 55° C. giving a homogeneous solution which is quickly cooled to 20° C. and 200 mg. of pyridine added. Crystals of IIIa come out spontaneously, are left several hours at 5° C. and collected by filtration, 337 mg. (76%), M.P. 194–195° C. dec.

*α-t-Butyl D- and DL-α-phenoxymethylpenicilloate (IV).*—To a solution of 9.10 g. of t-butyl DL-α-4-carboxy - 5,5-dimethyl-α-amino-2-thiazolidineacetate hydrochloride (DL–III) and 2.80 g. of triethylamine in 400 ml. of methylene chloride at a temperature of 0° C., there are added, simultaneously, a solution of 2.80 g. of triethylamine in 300 ml. of methylene chloride and a solution of 3.95 g. of phenoxyacetyl chloride in 300 ml. of methylene chloride over a period of 1.25 hours. After 40 hours at 5° C. the solution is washed twice with a solution containing equal volumes of 0.1 N hydrochloric acid and saturated sodium chloride, once with saturated sodium chloride, dried over magnesium sulfate and concentrated under reduced pressure to a colorless solid. From ether there is obtained 8.77 g., M.P. 142° C. dec. Recrystallization from ether-petroleum ether gives M.P. 143° C. dec.

In a similar manner phenoxyacetyl chloride and triethylamine are converted D–III into α-t-butyl D-α-phenoxymethylpenicilloate (DL–IV) in 70% yield; M.P. 120–122° C. dec., $[\alpha]_D^{25}+67°$ (c., 1 in methanol).

*D- and DL-α-phenoxymethylpenicilloic acid hydrochloride (V).*—A solution of 7.00 g. of α-t-butyl DL-α-phenoxymethylpenicilloate (DL–IV) in 280 ml. of methylene chloride, cooled to 0° C., is saturated with hydrogen chloride by passing the anhydrous gas through the solution for 15 minutes. Storage at 5° C. for 17 hours gives 5.91 g. (89%) of colorless crystals, M.P. 204–205° C. dec.

Similar treatment of 3.21 g. of D–IV in 52 ml. of methylene chloride affords 2.87 g. (94%) of D-α-phenoxymethylpenicilloic acid hydrochloride, M.P. 113° C. dec.

*D- and DL-α-phenoxymethylpenicilloic acid (VI).*—To a solution of 147 mg. of D–V in 0.60 ml. of acetone-water (1:2) is added 35 mg. of pyridine. Scratching produces a mass of crystals which are recrystallized from acetone-water to yield 113 mg. (81%), M.P. 125° C. dec. An additional recrystallization from this solvent combination gives analytically pure D-α-phenoxymethylpenicilloic acid hydrate, M.P. 129° C. dec., $[\alpha]_D^{25}+94°$ (c., 1 in methanol).

In a similar manner 73 mg. of DL–V gives, after one recrystallization from acetone-water, 23 mg. of DL-α-phenoxymethylpenicilloic acid, M.P. 132° C. dec.

*Potassium D-α-phenoxymethylpenicillinate (VII).*—To a solution of 2.54 g. of D-α-phenoxymethylpenicilloic acid hydrochloride (D–V) in 86 ml. of dioxane and 28 ml. of water is added with stirring 25.1 ml. of 0.50 N sodium hydroxide. To this solution of the monosodium salt of D–VI is added a solution of 1.21 g. of N,N¹-dicyclohexylcarbodiimide in one portion. After 25 minutes at room temperature 0.21 g. of N,N¹ dicyclohexylurea is removed by filtration and the filtrate lyophilized. The residue is taken up in 100 ml. of cold methanol, 100 ml. of water added followed by 300 ml. of 1.5 M pH 6.4 phosphate buffer. The water-insoluble material is filtered off and discarded. The penicillin is extracted from the buffer solution with ether at pH 2.5 and the crude sodium salt prepared by titration with 0.5 N sodium hydroxide to pH 6.8; lyophilization of the aqueous phase yields 1.36 g. of crude penicillin V. Bioassay and chemical assay of the crude product shows that penicillin V has been formed in 6% yield; the percent adsorption at 5.6μ in the infrared spectrum is also consistent with this yield. Distribution of the crude product between 0.15 M pH 5.5 potassium phosphate buffer (one third saturated with ammonium sulfate) yields a product containing 80% of penicillin V (as the potassium salt). By solution in 98% acetone there is obtained pure totally synthetic crystalline potassium D-α-phenoxymethylpenicillinate (penicillin V potassium), M.P. 263° C. dec. [reported, 256-260° uncorr.], [α]$_D^{25}$+223° (c., 0.2 in water). The natural and synthetic potassium salts are also the same by identical infrared spectra (in KBr) and by microbiological assay.

*DL-α-4-carboxy-5,5-dimethyl-α-amino-2-thiazolidineacetic acid dihydrochloride VIII.*—To a suspension of 10 g. of t-butyl DL-α-4-carboxy - 5,5 - dimethyl - α-amino-2-thiazolidineacetate (DL-III) at 0° C. is added dry hydrogen chloride until saturated and all solids are in solution. After 18 hours at 5° C. excess hydrogen chloride is removed at 25° C./35 mm. The product comes out as colorless crystals, 8.38 g. (84%), M.P. 90-120° C. dec.

*DL-α-4-carboxy-5,5-dimethyl-α-amino-2-thiazolidineacetic acid VIIIa.*—To a solution of 195 mg. of DL-α-4-carboxy-5,5-dimethyl-α-amino-2-thiazolidineacetic acid dihydrochloride (DL-VIII) in 1.5 ml. of dioxane-water (1:1) is added 145 mg. of pyridine and, on scratching, colorless crystals come out. After 6 hours at 5° C., 85 mg. (77%) of DL-VIIIa is collected by filtration, M.P. 163° C. dec.

*DL-α-6-aminopenicillanic acid (IX).*—To a solution of 195 mg. of DL-α-4-carboxy-5,5-dimethyl-α-amino-2-thiazolidineacetic acid dihydrochloride (VIII) in 8 ml. of dioxane and 2.6 ml. of water is added 2.4 ml. of 0.50 N sodium hydroxide. To this solution is added a solution of 116 mg. of N,N¹-dicyclohexylcarbodiimide in 5 ml. of dioxane. After 2 hours at room temperature 78 mg. of solid is filtered off. The filtrate is lyophilized to yield 236 mg. of a white solid. Chemical assay shows the yield of the lactam IX to be 8%. Absorption in the infrared spectrum at 5.68μ (KBr) is consistent with this yield.

*DL-α-phenoxymethylpenicillanic acid (X).*—To a solution of 118 mg. of crude DL-α-6-aminopenicillanic acid in dioxane-water (obtained directly from the cyclization of VIII to IX) is added, simultaneously, solutions of 104 mg. of phenoxyacetyl chloride in 5 ml. of dioxane and 30 mg. of triethylamine in 5 ml. of dioxane over a period of 5 minutes with stirring. The solution is lyophilized and the residue taken up in 10 ml. of methanol, 20 ml. of water added and the precipitate removed by filtration. Concentration of the filtrate to 5 ml. at 20° C./0.1 mm. causes precipitation of more solid which is also removed by filtration. The filtrate is freeze dried. Bioassay of the product against penicillin V indicates that the L isomer has little, if any, biological activity.

*DL-α-6-phenacetamidopenicillanic acid (DL-penicillin G).*—To a solution of 118 mg. of crude DL-α-6-aminopenicillanic acid in dioxane-water (obtained directly by the cyclization of DL-VIII by means of N,N'-dicyclohexylcarbodiimide) is added simultaneously solutions of 100 mg. of phenylacetyl chloride in 5 ml. of dioxane and 30 mg. of triethylamine in 5 ml. of dioxane over a 10-minute period with rapid stirring. After lyophilization the residue is triturated with a ½ methanol-water mixture and the insoluble N,N'-dicyclohexylurea is removed by filtration. The filtrate is diluted with 10 ml. of 5/10 molar pH 7 phosphate buffer and concentrated under reduced pressure at room temperature to ⅓ volume. Bioassay of the product shows benzyl penicillin (Penicillin G) to be present.

*DL-α-acetamidopenicillanic acid.*—To a solution of 118 mg. of crude DL-α-6-aminopenicillanic acid in dioxane-water (obtained by the cyclization of DL-VIII by means of N,N'-dicyclohexylcarbodiimide) is added a solution of 150 mg. of acetic anhydride in 5 ml. of dioxane and a solution of 2/10 ml. of pyridine in 5 ml. of dioxane. After 20 minutes at room temperature, the solution is lyophilized. The solid is triturated with 2 ml. of acetone and diluted with 10 ml. of 5/10 molar pH 7 phosphate buffer. The filtered solution shows antibiotic activity. Acidification of the buffer to pH 2 transferred into methylene chloride solution, followed by re-extraction with 1/100 normal sodium hydroxide solution to pH 7, gives an aqueous solution which is lyophilized to a colorless powder which shows marked absorption in the infrared at 5.62μ characteristic of a β-lactam, and also absorption at 6.6 attributable to a mono-substituted amide.

*DL-α-methanesulfonamidopenicillanic acid.*—To a solution of 2 g. of crude DL-α-6-aminopenicillanic acid in dioxane-water (obtained directly from the cyclization of DL-VIII by the use of dicyclohexylcarbodiimide) is added 1.5 g. of methanesulfonyl chloride in 100 ml. of dioxane with a simultaneous addition of a solution of 1 g. of triethylamine in 50 ml. of dioxane over a 10-minute period at 5° C. After one hour the solution is lyophilized. The DL-α-methanesulfonamidopenicillanic acid is isolated (countercurrent distribution) and crystallized as the N-ethylpiperidine salt from methanol-ethyl ether (⅕), M.P. 174-175° C. The bacteriostatic endpoint in mcg. of active isomer per ml. is 0.25 for Streptococcus and 3.9 for Staphylococcus aureus.

*DL-α-carbomethoxyamidopenicillanic acid.*—To a solution of 2 g. of DL-α-6-aminopenicillanic acid in dioxane-water (obtained by the cyclization of DL-VIII with N,N'-dicyclohexylcarbodiimide) is added simultaneously a solution of 1.5 g. methyl chloroformate in 100 ml. of dioxane and a solution of 1 g. triethylamine in 50 ml. of dioxane over a 10-minute period at 5° C. After one hour the solution is lyophilized. The penicillanic acid is isolated by means of countercurrent distribution as the N-ethyl-piperidine salt, M.P. 131-133° C. The bacteriostatic endpoint in mcg. of active isomer per ml. is 1.9 for Streptococcus and 3.9 for Staphylococcus aureus.

I claim:

1. A method of making acylaminopenicillanic acids of the formula

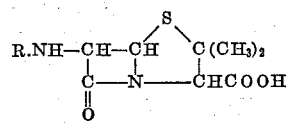

wherein R is an organic acid radical which comprises subjecting aminopenicillanic acid of the formula

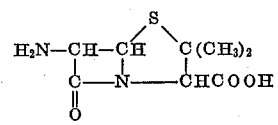

to the action of an organic acid acylating agent.

2. A method of making acylaminopenicillanic acids of the formula

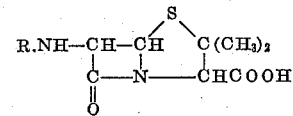

wherein R is an organic carboxylic acid radical which comprises subjecting aminopenicillanic acid of the formula

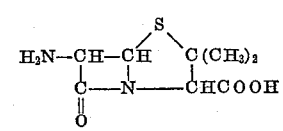

to the action of an organic carboxylic acid acylating agent.

3. A method of making acylaminopenicillanic acids of the formula

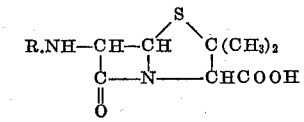

wherein R is an organic acid radical which comprises subjecting aminopenicillanic acid of the formula

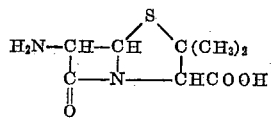

to the action of an organic acid halide.

4. A method of making acylaminopenicillanic acids of the formula

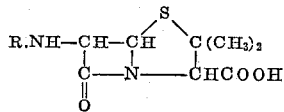

wherein R is an organic carboxylic acid radical which comprises subjecting aminopenicillanic acid of the formula

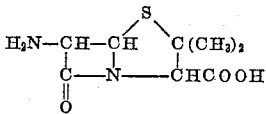

to the action of an organic carboxylic acid halide.

5. A method of making acylaminopenicillanic acids of the formula

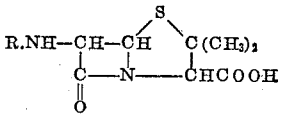

wherein R is a phenoxy-lower-alkanoic acid radical which comprises subjecting aminopenicillanic acid of the formula

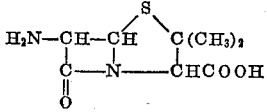

to the action of a phenoxy-lower-alkanoic acid acylating agent.

6. A method of making acylaminopenicillanic acids of the formula

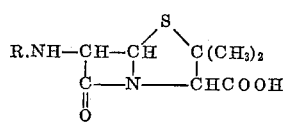

wherein R is a phenoxy-lower-alkanoic acid radical which comprises subjecting aminopenicillanic acid of the formula

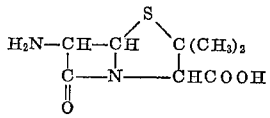

to the action of a phenoxy-lower-alkanoyl halide.

References Cited by the Examiner

Arnstein et al.: Biochem. Jour., vol. 67, pages 180–187 (1957).
Hockenhull et al.: Arch. Biochem. vol. 23, pages 160–161 (1949).
Kato: The Journal of Antibitotics, vol. VI, No. 3 pages 130–135 (1953).
Thielheimer: Synthetic Methods of Organic Chemistry, vol. 2, page 155 (1949).
Theilheimer: Synthetische Methoden der Organischen Chemie, vol. 3, page 82 (1949).
Theilheimer: Synthetic Methods of Organic Chemistry, vol. 5, page 89 (1951).
Theilheimer: Synthetic Methods of Organic Chemistry, vol. 9, page 277 (1955).

NICHOLAS S. RIZZO, *Primary Examiner.*

IRVING MARCUS, H. LIDOFF, *Examiners.*